Figure 1:
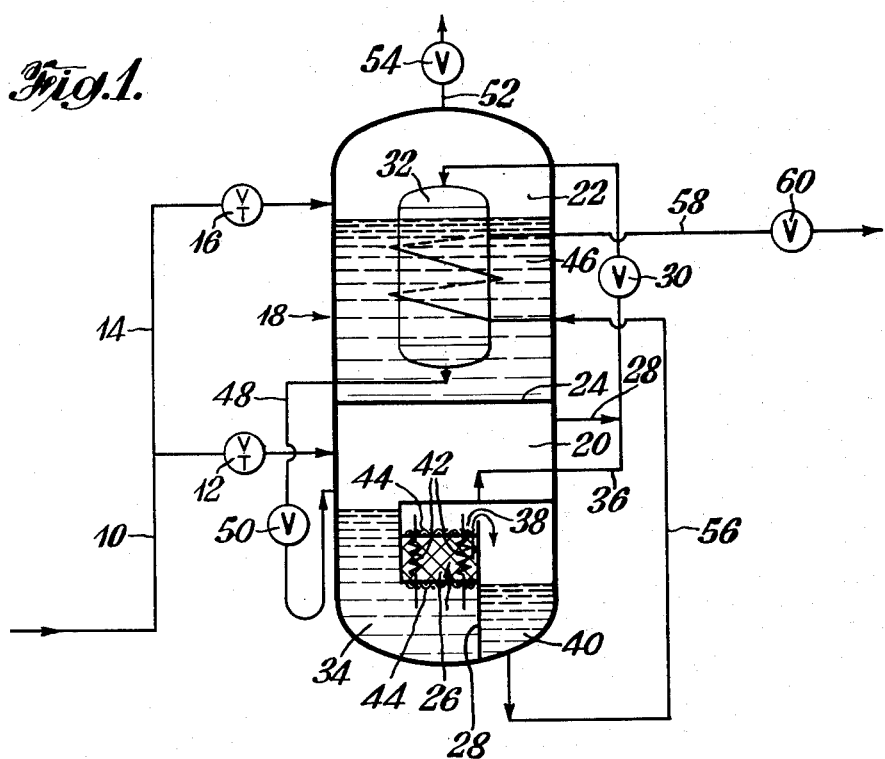

Dec. 31, 1963   G. L. KASPARIAN ETAL   3,116,115
PROCESS AND APPARATUS FOR ORTHO-TO-PARA HYDROGEN CONVERSION
Filed June 29, 1961

INVENTORS
GEORGE L. KASPARIAN
GEORGE J. NOVAK
CHARLES V. SNYDER

BY William F. Mesinger
ATTORNEY

United States Patent Office 3,116,115
Patented Dec. 31, 1963

3,116,115
PROCESS AND APPARATUS FOR ORTHO-TO-PARA HYDROGEN CONVERSION
George L. Kasparian and George J. Novak, Williamsville, and Charles V. Snyder, Cheektowaga, N.Y., assignors to Union Carbide Corporation, a corporation of New York
Filed June 29, 1961, Ser. No. 120,769
12 Claims. (Cl. 23—210)

This invention relates to improved process and apparatus for converting ortho hydrogen to para hydrogen. More specifically, it relates to an improved system for producing para-rich, liquid hydrogen from compressed, precooled hydrogen gas feed.

It is well known that hydrogen exists in two molecular forms called ortho (nuclei spins parallel) and para (nuclei spins anti-parallel). In hydrogen gas at 300° K. the theoretical equilibruim concentrations exist, and the gas contains 3 parts ortho:1 part para. When this normal hydrogen is liquefied and stored, the 3:1::ortho:para ratio changes (during storage) to a predominantly para-hydrogen mixture. The ortho-to-para conversion is accompanied by the evolution of about 250 calories per gram mole. Since this is greater than the heat of vaporization of hydrogen (218 calories per gram mole) the conversion of one gram mole of ortho hydrogen to para hydrogen supplies enough heat to result in the evaporation of more than one mole of liquid. In fact, measurements show that the uncatalyzed ortho-to-para conversion can cause the loss of 0.9 percent of the stored liquid hydrogen per hour when the liquid is about 68 mole percent ortho hydrogen. This rate of ortho-to-para conversion (and consequent evaporation of hydrogen) is not constant but varies directly with the third power of the ortho mole fraction. The loss rate when the ortho form predominates in the mixture is many times the loss due to heat leakage through modern storage containers. For efficient and successful storage of liquid hydrogen, the more stable low temperature ortho:para equilibrium concentration should be produced ant stored.

It is also known that hydrogen is more rapidly converted from the ortho form to the more stable para hydrogen form in either the vapor or liquid phase using a suitable catalyst material. Catalysts that have been employed include charcoal, reduced iron, para-magnetic rare earth oxides, para-magnetic salts and chromatic oxide supported on alumina. The most efficient presently used catalyst is a hydrated ferric oxide, as for example prepared in accordance with the teachings of U.S. Patent 2,943,917 to Weitzel et al.

The prior art has evolved a simple catalytic converter arrangement which has been successful in producing as much as 225 liters of 95% para hydrogen per hour. In this arrangement, the cold hydrogen feed is divided into two streams, one stream being isenthalpicly expanded (throttled) to produce a liquid bath, and the other stream being throttled through a hydrated ferric oxide catalyst bed and heat exchanger tube immersed within the throttled liquid hydrogen bath. By this arrangement only the product liquid part is converted to high para hydrogen, and the partially converted hydrogen gas portion arising from the exothermic catalytic conversion reaction is partially recondensed by the surrounding unconverted liquid hydrogen.

The commercial needs for liquid hydrogen have increased manyfold in recent years, so that much larger ortho-to-para hydrogen conversion systems are needed. However, when one attempts to adapt the previously described simple catalytic converter arrangement for large-scale production, serious limitations are encountered. For example, the vapor evolved in the catalyst bed is only partially converted to the para form, so that the conversion efficiency is restricted and a relatively large quantity of expensive catalyst material is needed for high para hydrogen production rates. Another disadvantage of the immersed heat exchanger system is that the liquid formed by the throttling step is forced through the heat exchanger passages along with partially converted vapor. The liquid tends to blanket the heat transfer surfaces thereby limiting heat exchange between the vapor and the unconverted liquid hydrogen refrigerant. This represents another limitation to the overall liquefaction-conversion efficiency of the system.

An object of this invention is to provide an improved, highly efficient system for producing para-rich liquid hydrogen.

Another object is to provide an improved, highly efficient catalytic system for converting ortho hydrogen to para-rich hydrogen.

A further object is to provide an ortho-to-para hydrogen conversion system which is highly efficient for high production rates.

A still further object is to provide a catalytic system for converting ortho-to-para hydrogen in which the quantity of hydrogen converted per pound of catalyst is higher than heretofore attainable.

Other objects and advantages of the invention will be apparent from the following disclosure and appended claims.

Figure 2:
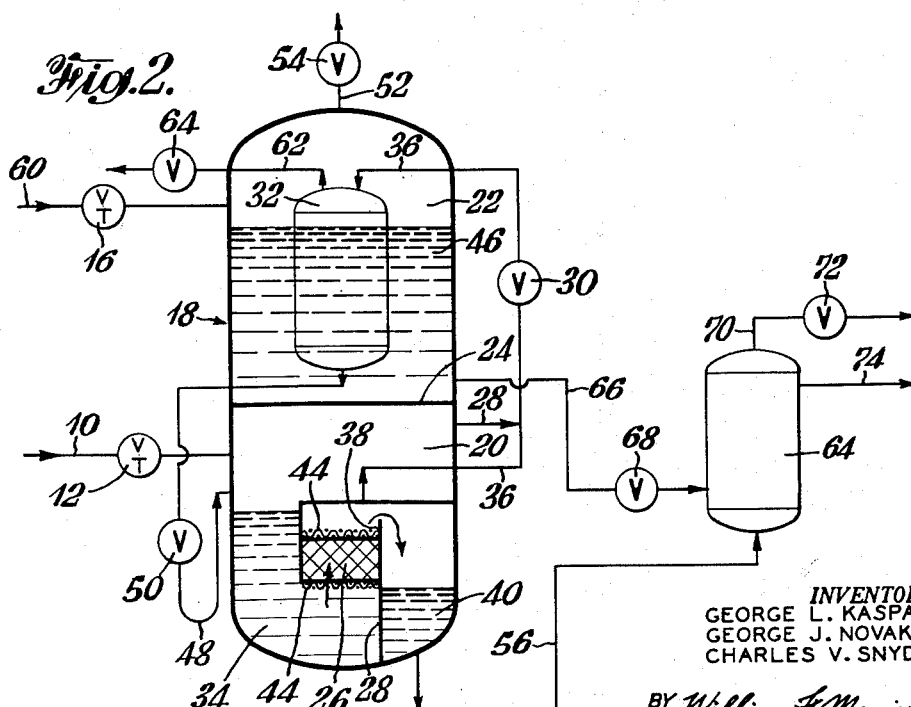

In the drawings:
FIG. 1 is a schematic flowsheet of a system for producing para hydrogen according to this invention, and
FIG. 2 is a schematic flowsheet of a system similar to the FIG. 1 embodiment, but differing in certain particulars.

Corresponding items in the two figures have been identified by the same numbers for purposes of clarity.

According to one process embodiment of the invention, a compressed, precooled hydrogen feed gas is supplied at below 80° K. and at 20–200 atmospheres pressure, and contains at least 50% para hydrogen. This feed is throttle expanded to below about 2 atmospheres pressure thereby cooling and partially liquefying the gas by the Joule-Thomson effect. A first portion of the partially liquefied feed is passed to a conversion zone, and a second portion directed to a condensation zone at lower pressure than the conversion zone. The throttled vapor of the first portion is transferred from the conversion zone to the condensation zone, and heat exchanged with the second portion liquid for condensation thereof. The resulting condensed throttled liquid is then recycled to the first portion in the conversion zone.

The liquid hydrogen of the first portion is contacted with an ortho-to-para hydrogen conversion catalyst mass in the conversion zone. The vapor formed by such conversion is separated from the converted liquid and heat exchanged with the second portion liquid in the condensation zone, thereby condensing the vapor. The condensed partially converted fluid is then recycled to the first portion in the conversion zone. The para-rich hydrogen liquid product is heat exchanged with at least part of the liquid hydrogen second portion which is at lower pressure than the product. In this manner the product liquid is subcooled.

It will be recognized from the foregoing description that the present invention requires phase separation of both the throttled and partially liquefied feed stream before conversion, as well as the separation of the product stream after conversion. In this manner the vapor may be recovered, subsequently condensed in a highly efficient manner and recycled to the conversion zone for more efficient liquid phase conversion. Thus, only the colder liquid part of the throttled feed stream is contacted with the conversion catalyst. This means that as compared with a combined liquid-vapor catalyst contact system, a higher para content may be achieved for a particular quantity of catalyst mass. Alternatively, the invention permits the use of a smaller catalyst bed to achieve a particular para content of hydrogen product.

Another advantage of this invention is that the throttled hydrogen condensation step is more efficient that the prior art scheme, since the fluid to be condensed is entirely in the vapor phase and not partly liquid. The significance of this difference is that smaller heat exchange surface area is needed.

It has also been found that the separate treatment of liquid and gas portions of the feed stream before and after the conversion allows for more precise prediction of performance, thereby requiring less heat exchanger surface. A further important advantage of the phase separation steps is that any uncondensable helium gas present in the feed stream may be removed before the subcooling step. Subcooling permits transferring the fully converted liquid product to storage under sufficient pressure to eliminate the need for pumping, and without resulting flashing losses in the storage tank.

In an apparatus embodiment of the invention, a vessel is provided having a lower conversion section containing an ortho-to-para hydrogen conversion catalyst mass. The vessel also has an upper condensation section separate from the lower section and having heat exchange means therein. Conduit means are used for introducing a partially liquefied hydrogen feed to the lower conversion section for contact with the conversion catalyst mass. Conduit means are afforded for transferring the vapor from the hydrogen feed in the lower section to the heat exchange means in the upper condensation section. Conduit means are also positioned for transferring partially converted vapor formed by hydrogen feed-conversion catalyst contact, from the lower section to the heat exchange means in the upper condensation section. The present apparatus also includes conduit means for introducing liquid hydrogen to the upper condensation section for thermal association with the heat exchange means so as to condense the hydrogen feed vapor and the conversion vapor. Means are provided for withdrawing para-rich liquid hydrogen product from the lower section, and additional means are utilized for subcooling the product by thermal association with at least part of the liquid hydrogen of the upper section.

Referring now more specifically to the drawings and FIG. 1, a compressed precooled hydrogen gas feed stream is introduced through conduit 10 at a pressure of 20–200 atmospheres, as for example 60 atmospheres. In one plant practicing the FIG. 1 embodiment, the feed stream in conduit 10 is about 230,400 c.f.h. hydrogen gas. The gas may have been previously cooled by e.g. liquid nitrogen refrigeration and Joule-Thomson isenthalpic expansion to a temperature below about 80° K., as for example 26° K. Under these conditions the equilibrium concentration is at least 50% para hydrogen. It is to be understood that the instant ortho-to-para hydrogen conversion system may constitute the only conversion step. Alternatively, the feed 10 may have been subjected to previous conversion steps in which event the para concentration is greater than 50%.

A first portion of the gas feed is throttled through valve 12 to a pressure of below 2 atmospheres, with the resulting formation of about 80% liquid. Simultaneously, a second portion of the gas feed is directed through branch conduit 14 and throttled through valve 16 to a pressure lower than the isenthalpicly expanded first portion. In the empirical example, both portions are about 115,200 c.f.h., and the throttled pressures and temperatures are about 7.4 and 2.4 p.s.i.g., and 21° K. respectively.

Converter-condenser vessel 18 is provided with a lower conversion section 20 and an upper condensation section 22, the two sections being separated by pressure-tight plate 24. The throttled feed first portion is admitted to lower conversion section 20 through conduit 10, and the throttled feed second portion is introduced to upper condensation section 22 through conduit 14.

Lower section 20 contains catalyst bed 26 supported by brace members 28, which bed may be any convenient shape such as rectangular, cylindrical, or torus-shaped. The vapor of the throttled first portion admitted to lower conversion section 20 through conduit 10 is separated from the liquid and conducted through conduit 28 having control valve 30 therein to the upper end of heat exchanger 32 in upper condensation section 22. The remaining liquid part of the first portion in lower section 20 forms liquid pool 34 flowing upwardly through conversion catalyst mass 26, and is converted therein to equilibrium para concentration of at least 95% at the existing liquid hydrogen temperature. The upward flow of liquid through the catalyst bed is preferred to avoid the formation of a vapor barrier which results from the heat of conversion when the liquid is allowed to trickle downwardly through the bed. Since the ortho-to-para hydrogen conversion is exothermic, considerable gas is evolved. This partially converted gas portion separates from the converted liquid product and rises through conduit 36 for juncture with the unconverted feed gas portion in conduit for flow to the upper end of heat exchanger 32.

The converted liquid product at the top end of catalyst mass 26 spills over weir 38 and drops into outlet section 40. The weir maintains the mass 26 in a flooded condition thereby insuring uniform flow distribution and maximum use of the catalyst. The catalyst mass or bed 26 may be reactivated either by passing a warm dry gas such as nitrogen through it, or by heating means 42 such as steam coils or electric heaters located within the bed, with the former method being preferred. The catalyst bed 26 is confined by, for example, screens 44 on the upper and lower sides, and is kept full by additional catalyst material flowing by gravity from a filling tube (not shown). As previously indicated, the catalyst bed 26 may be formed in any convenient shape, the important considerations being the quantity of catalyst material provided, contact time, and good flow distribution to ensure effective use of the material. This is achieved by preferably having the bed thickness less than the width dimension, and by the outlet weir 38 which maintains the bed in a flooded condition and helps ensure complete conversion by preventing channeling through the bed.

Returning now to upper section 22, the liquid part of the second feed portion accumulates in pool 46 surrounding and at least partially immersing heat exchanger 32. The first portion and conversion vapor entering the top end of exchanger 32 flows downwardly therethrough and is condensed by heat exchange with the colder liquid hydrogen second portion pool 46. The resulting liquid is drained from heat exchanger 32 through trapped conduit 48 having control valve 50 therein, and flows back to the lower conversion section. Heat transfer in exchanger 32 is controlled by varying the effective heat transfer area therein by raising or lowering the liquid level using valve 50. The vapor from the boiling liquid pool 46 is vented from the top end of upper condensing section 22 through conduit 52 containing control valve 54 for subsequent use. For example, such vapor contains considerable sensible refrigeration which may be recovered by warming against the incoming hydrogen feed stream.

The product para-rich liquid hydrogen is withdrawn from outlet section 40 of lower condensing section 20 through conduit 56 and directed to upper section 22 for flow through separate passageway 58 of heat exchanger 32. In this manner, the product liquid is subcooled by the second portion unconverted liquid hydrogen at lower pressure. Following subcooling, the product liquid is withdrawn through control valve 60 for storage or immediate use. In the empirical example, the product specifications are about 115,200 c.f.h., 7.2 p.s.i.g., 21° K. and 100% liquid. It is to be noted that the pressure of the subcooled para-rich liquid hydrogen may still be sufficient for transfer to a storage tank without the necessity of pumping and without causing flashing in the storage tank.

The relative quantities of throttle expanded and substantially liquefied hydrogen feed stream may be regulated by adjustment of throttle valves 12 and 16. Also, the liquid parts of the first and second portions accumulate in pools 34 and 46 to controlled levels. The liquid level of upper pool 46 is controlled to a desired level by throttle valves 12 and 16. The liquid level of lower pool 34 may be controlled by liquid withdrawal valve 60 located downstream of the subcooling step.

The pressure level in lower conversion section 20 may be controlled by vapor withdrawal valve 30, and in the upper condensing section 22 the pressure may be controlled by vent valve 54.

FIG. 2 shows another embodiment of the invention which is similar to FIG. 1 but differs in certain details to be described.

If desired, the unconverted hydrogen second portion used for condensing the partially converted vapor may be provided completely independently of the first portion, as for example by conduit 60. The precooled, compressed cold hydrogen gas is isenthalpicly expanded through throttle valve 16 and thereafter introduced to upper section 22 for use as the refrigerant for heat exchanger 32. Control of the pressure in the upper condenser section 22 is afforded by control valve 54 located in the refrigerant vent conduit 52. Operation of condenser section 22 is essentially the same as for FIG. 1 except that provision is made for removal of any noncondensable gas such as helium, from the condensed vapor before recycling the latter from heat exchanger 32 to the lower conversion section 20 through conduit 48 and control valve 50 therein. This is accomplished by means of bleed-off conduit 62 and control valve 64 therein, communicating with heat exchanger 32.

The para-rich liquid hydrogen product is drained through the outlet portion 40 of lower converter section 20 through conduit 56, and directed to heat exchanger 64 for subcooling therein. Simultaneously a part of the unconverted, lower pressure liquid hydrogen refrigerant is transferred from pool 46 through conduit 66 and control valve 68 therein to heat exchanger 64 for subcooling of the para-rich liquid hydrogen product. The subcooled liquid product is discharged from heat exchanger 64 through conduit 70 having control valve 72 therein and the evaporated refrigerant is discharged through conduit 74. This manner of subcooling control is more convenient than the FIG. 1 embodiment, and consequently is preferred especially for large-capacity plants.

Although the preferred embodiments have been described in detail, it is contemplated that modifications of the process and apparatus may be made and that some features may be employed without others, all within the spirit and scope of the invention as set forth herein. For example, instead of employing an open circuit liquid hydrogen refrigeration cycle, a closed circuit arrangement may be used. In this event, the hydrogen effluent leaving upper condensing section 22 through conduit 52 along with the gas from conduit 74 if the external subcooler 64 is used, may be warmed to near ambient temperature, recompressed, recooled and liquefied by Joule-Thomson expansion. The resulting liquid would then be returned through conduit 14 to upper condensing section 22.

What is claimed is:

1. Process for producing para-rich liquid hydrogen comprising the steps of providing compressed, precooled hydrogen gas feed at below 80° K. and at 20-200 atmospheres pressure, and containing at least 50% para hydrogen; throttle expanding said gas feed to below about 2 atmospheres pressure thereby partially liquefying such feed; passing a first portion of the partially liquefied feed to a conversion zone, passing a second portion of the partially liquefied feed to a condensation zone at lower pressure than said conversion zone; transferring the throttled vapor of said first portion from said conversion zone to said condensation zone and heat exchanging said throttled vapor with the second portion liquid for condensation thereof; recycling the condensed throttled fluid to said first portion in said conversion zone; contacting the liquid hydrogen of said first portion with an ortho-to-para conversion catalyst mass in said conversion zone; separating the vapor formed by such conversion from th converted liquid and heat exchanging the conversion vapor with said second portion liquid in said condensation zone, thereby condensing such vapor; recycling the condensed conversion fluid to said first portion in said conversion zone; and heat exchanging the para-rich converted hydrogen liquid product with at least part of the liquid hydrogen second portion being at lower pressure than the product, thereby subcooling the para-rich liquid hydrogen product.

2. Process for producing para-rich liquid hydrogen comprising the steps of: providing compressed, precooled hydrogen gas feed at below about 80° K. and at 20-200 atmospheres pressure, and containing at least about 50% para hydrogen; throttle expanding said feed stream to below about two atmospheres pressure thereby partially liquefying such feed; dividing the partially liquefied stream into two portions and passing the first portion to a conversion zone; passing the second portion of said partially liquefied feed to a condensation zone at lower pressure than said conversion zone; transferring the throttled vapor of said first portion from said conversion zone to said condensation zone and heat exchanging said throttled vapor with the second portion liquid for condensation thereof; recycling the condensed throttled fluid to said first portion in said conversion zone; contacting the liquid hydrogen of said first portion with an ortho-to-para conversion catalyst mass in said conversion zone; separating the vapor formed by such conversion from the converted liquid and heat exchanging the conversion vapor with said second portion liquid in said condensation zone, thereby condensing such vapor; recycling the condensed conversion fluid to said first portion in said conversion zone; and heat exchanging the para-rich converted hydrogen liquid product with at least part of the liquid hydrogen second portion being at lower pressure than the product, thereby subcooling the para-rich liquid hydrogen product.

3. Process according to claim 1 in which said para-rich liquid hydrogen product is subcooled by said liquid hydrogen second portion in said condensation zone.

4. Process according to claim 1 in which part of said liquid hydrogen second portion is withdrawn from said condensation zone for said subcooling of said para-rich liquid hydrogen product.

5. Process according to claim 1 in which hydrous ferric oxide is said ortho-to-para conversion catalyst mass.

6. Process according to claim 1 in which said hydrogen gas feed contains non-condensable gas which is separated from said condensed throttled fluid and said condensed conversion fluid prior to said recycling to the first portion in said conversion zone.

7. Apparatus for producing para-rich liquid hydrogen comprising a vessel having a lower conversion section containing an ortho-to-para hydrogen conversion catalyst mass; an upper condensation section separate from the lower section and having heat exchange means therein; means for separating said conversion section from said condensation section; conduit means for introducing a partially liquefied hydrogen feed to the lower conversion section for contact with said conversion catalyst mass; conduit means leading from a point in said lower conversion section disposed above said conversion catalyst mass and above the liquid surface formed by said partially liquefied hydrogen feed for transferring the vapor from said hydrogen feed in the lower section to said heat exchange means in said upper condensation section; conduit means for transferring conversion vapor formed by hydrogen feed-conversion catalyst contact, from said lower section to said heat exchange means in said upper condensation section; conduit means for introducing liquid hydrogen to said upper condensation section for thermal association with said heat exchange means so as to condense the hydrogen feed vapor and conversion vapor; means for recycling the condensed hydrogen vapor from said heat exchange means to said lower section; means for withdrawing para-rich liquid hydrogen product from said lower section; and means for subcooling such product by thermal association with at least part of said liquid hydrogen of said upper section.

8. Apparatus according to claim 7 in which the para-rich liquid hydrogen product subcooling means comprises passageway means in said upper condensation section.

9. Apparatus according to claim 7 in which conduit means are provided for discharging a portion of said liquid hydrogen from said upper condensation section, and the para-rich liquid hydrogen product subcooling means comprises heat exchange means between the withdrawn para-rich liquid hydrogen product and the discharged portion of said liquid hydrogen.

10. Apparatus according to claim 7 in which hydrous ferric oxide is said ortho-to-para conversion catalyst mass.

11. Apparatus according to claim 7 in which means are provided in said lower conversion section for directing the liquid hydrogen feed flow upwardly through said ortho-to-para hydrogen conversion catalyst mass.

12. Apparatus according to claim 7 in which means are provided in said lower conversion section for directing the liquid hydrogen feed flow upwardly through said ortho-to-para hydrogen conversion catalyst mass, and outlet liquid weir means are provided at the upper end of such catalyst mass.

References Cited in the file of this patent

Proceedings of the 1956 Cryogenic Engineering Conference (A–3), Catalysis of the Ortho-Parahydrogen Conversion by Weitzel et al., CEL, National Bureau of Standards, Boulder, Colorado (page 12–18).